United States Patent Office 3,065,259
Patented Nov. 20, 1962

3,065,259
METHOD OF MAKING α-DIKETONES
Janos Kollonitsch, Westfield, N.J., assignor to Merck & Co., Inc., Rahway, N.J., a corporation of New Jersey
No Drawing. Filed Feb. 27, 1961, Ser. No. 91,629
14 Claims. (Cl. 260—483)

This invention relates to a method for preparing α-diketones and more particularly to a method for preparing α-diketones using as an alkylating agent a mixture of an organo-metallic compound substantially free of magnesium salts, and a lithium halide.

The object of the present invention is to provide a method for preparing α-diketones in improved yields.

In accordance with the process of the present invention, there is provided a method for preparing α-diketones in high yields. The term α-diketones used herein is intended to include the related α-keto esters. The method of the invention involves a chemical reaction between an α-diketone precursor,

wherein at least one group attached to a carbonyl carbon atom is halogen, with an organo-metallic compound, $R_2M$, where M is either cadmium or zinc and R is typically an alkyl or aryl group. The organo-metallic compound used herein is substantially free of magnesium salts. As a feature of the invention, the reaction is run in the presence of a lithium halide and at rather low temperatures. There is produced according to this reaction the corresponding α-diketone,

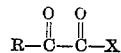

where R is as defined previously and X is alkyl, aryl or alkoxy.

Hereinafter the process of the present invention will be described with specific reference to the use of organo-cadmium compounds in the reaction, although it will be understood that the corresponding zinc-organo compounds are also suitable.

The organo-cadmium reagent is preferably prepared in accordance with the process described in my copending application, Serial No. 86,291 filed Feb. 1, 1961. As is presented in detail therein, dialkyl cadmium, for example, may be prepared substantially free of magnesium salts by first reacting an alkyl magnesium halide with a cadmium halide. Thereafter the magnesium halide by-products of the reaction are separated from the dialkyl cadmium by adding an ether containing two ether-oxygen atoms, such as dioxane, to the mixture, whereupon the dialkyl cadmium remains in the solution while magnesium halide precipitates out.

The use of magnesium free organo-cadmium compounds prevents the reaction from proceeding beyond the α-diketone stage, thereby forming undesirable by-products. In accordance with the present invention an activating reagent of lesser strength than magnesium halide is provided so that the reaction proceeds and then stops when the α-diketone product is obtained. This reagent is a lithium halide, wherein the halogen preferably has an atomic weight between 35 and 80.

While the reaction conditions of the method of the present invention may be varied considerably, it is preferable to employ low temperatures, suitably below 0° C. and preferably between —80° and 0° C. The range —40° to —60° C. is considered optimum.

The solvent used in the reaction may be chosen among those common organic solvents which are inert toward the reactants. Suitable solvents are ethers, such as tetrahydrofuran, or hydrocarbons, such as benzene or toluene.

The starting precursor of the α-diketone product has at least one halogen, which has an atomic weight between 35 and 80, such as chloro, attached to a carbonyl carbon atom and available for immediate reaction with the organo-cadmium compound. The remaining groups may be selected from among several otherwise inert groups, such as alkyl, aryl and alkoxy.

As has been indicated previously, the organo-cadmium compound may be chosen among those commonly known in the art, such as a dialkyl cadmium, for example, dimethyl cadmium or dibutyl cadmium, a diaryl cadmium, such as diphenyl cadmium, or a cycloalkyl cadmium, such as dicyclohexyl cadmium.

The essential feature of the present invention is to provide a reaction between those aforementioned reagents so that it proceeds only to the α-diketone stage, thereby producing the desired product in high yields. Accordingly, a wide variety of α-diketones and α-keto esters may be produced herewith by utilizing the essential novel characteristics of the present invention. For example, both symmetrical and unsymmetrical α-diketones may be produced in high yields as will be apparent to those skilled in the art.

α-Diketones and α-keto esters find a wide utility in synthetic organic-chemistry, particularly as intermediates in the preparation of more complex structures, in particular heterocyclic structures. Accordingly, the method of the present invention is particularly desirable to produce such intermediates. For example, the α-diketone, diacetyl, useful as a flavoring agent in the butter industry, may be converted by reaction with o-phenylenediamine to a dimethylquinoxaline, a class of antibacterial compositions.

EXAMPLE I 5,6-Decanedione

Oxalychloride, 6.35 g. (0.05 mole) is dissolved in 15 ml. of dry tetrahydrofuran at —10° C., and a solution of 8.7 g. (0.01 mole) of lithium bromide in 35 ml. of tetrahydrofuran is added thereto. The mixture is then cooled to —45° C. while stirring under dry nitrogen and a solution of 11.3 g. (0.05 mole) of dibutylcadmium, prepared by the method described previously, in 15 ml. of tetrahydrofuran is added over a period of 55 minutes while keeping the solution between —41° and —48° C. The reaction is quite exothermic. The solution is then stirred for an additional 30 minutes. A crystal clear greenish-yellow solution is obtained. After warming to room temperature, the tetrahydrofuran is distilled off in vacuo at room temperature. To the thick oily residue is added 50 ml. of water and the oil extracted with ether (2×50 ml.), washed with sodium bicarbonate solution (2×10 ml.) and dried over magnesium sulfate. The ether is then distilled off and the residue fractionated in vacuo. 5 g. of 5,6-decanedione is obtained. The yield is 59% of theory.

Following the procedure described in detail above using equivalent quantities of diphenylcadmium, dicyclohexylcadmium and dimethylcadmium in place of dibutylcadmium, the corresopnding α-diketones are obtained.

EXAMPLE II

Ethyl Pyruvate

Ethyl chlorooxalate, 13.7 g. (0.1 mol) is dissolved in 10 ml. of tetrahydrofuran at —30° C. To this solution is added lithium bromide, 8.7 g. (0.1 mol) in 35 ml. of tetrahydrofuran. Thereafter 7.1 g. (0.05 mol) of dimethylcadmium in 20 ml. of tetrahydrofuran is added at —65° C. and the reaction mixture is stirred for another hour while maintaining the solution at —65° C. The tetrahydrofuran is then distilled off in vacuo at —25° C., the residue taken up in water, extracted several times with ether, then the combined ether extracts are concentrated to give 5.9 g. (51%) of ethyl pyruvate. (B.P. 52–53°).

EXAMPLE III

*Ethyl-α-Ketocaproate*

Ethyl chlorooxalate, 13.7 g. (0.1 mol) is dissolved in 10 ml. of tetrahydrofuran at −30° C. To the solution is added lithium bromide, 8.7 g. (0.1 mol) in 35 ml. of tetrahydrofuran. Thereafter 7.1 g. (0.05 mol) of dibutylcadmium in 20 ml. of tetrahydrofuran is added at −40° C. and the reaction mixture is stirred for another hour while maintaining the solution at −40° C. The tetrahydrofuran is then distilled off in vacuo at −25° C., the residue taken up in water, extracted with ether and concentrated free of ether. 5.9 g. (70%) of ethyl-α-ketocaproate is obtained (B.P. 52–53°).

EXAMPLE IV

Following the procedure described in detail above phenylglyoxalylchloride is reacted with dibutylcadmium to produce phenylbutyldiketone.

What is claimed is:

1. A method of preparing α-diketones in improved yields which comprises reacting a compound having the formula:

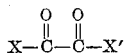

where X is selected from the group consisting of chloro, bromo iodo, and alkoxy and X' is selected from the group consisting of said preceding radicals and alkyl, aryl, aralkyl, alkaryl and cycloalkyl with a substantially pure organo-metallic compound, $R_2M$ where M is selected from the group consisting of cadmium and zinc and R selected from the group consisting of alkyl, aryl, aralkyl, alkaryl and cycloalkyl, said compound being essentially free of magnesium salts, in the presence of a lithium halide, at temperatures below 0° C.

2. The method in accordance with claim 1 wherein X is chloro.
3. The method in accordance with claim 1 wherein X is alkoxy.
4. The method in accordance with claim 1 wherein R is alkyl.
5. The method in accordance with claim 1 wherein R is aryl.
6. The method in accordance with claim 1 wherein R is cycloalkyl.
7. The method in accordance with claim 1 wherein M is cadmium.
8. The method in accordance with claim 1 wherein M is zinc.
9. The method in accordance with claim 1 wherein lithium halide is lithium bromide.
10. The method in accordance with claim 1 wherein the reaction temperature is between about −80° and 0° C.
11. The method in accordance with claim 1 wherein the reaction temperature is between about −40° and 65° C.
12. A method for the preparation of 5,6 decanedione in high yields which comprises reacting oxalychloride with dibutylcadmium essentially free of magnesium salts in tetrahydrofuran in the presence of lithium bromide at −45° C. and recovering said 5,6 decanedione thus formed.
13. A method of preparing ethyl pyruvate in high yields which comprises reacting ethyl chlorooxalate with dimethylcadmium essentially free of magnesium salts in tetrahydrofuran at −65° C. and recovering said ethyl pyruvate thus formed.
14. A method of preparing ethyl-α-ketocaproate in high yields which comprises reacting ethyl chlorooxalate with dibutylcadmium essentially free of magnesium salts in tetrahydrofuran in the presence of lithium bromide at −40° C. and recovering said ethyl-α-ketocaproate thus formed.

No references cited.